US009361274B2

(12) United States Patent  
Chu et al.

(10) Patent No.: US 9,361,274 B2  
(45) Date of Patent: Jun. 7, 2016

(54) INTERACTION DETECTION FOR GENERALIZED LINEAR MODELS FOR A PURCHASE DECISION

(71) Applicant: International Business Machines Corporation, Armonk, NY (US)

(72) Inventors: Yea J. Chu, Chicago, IL (US); Sier Han, Xi'an (CN); Jing-Yun Shyr, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 13/793,724

(22) Filed: Mar. 11, 2013

(65) Prior Publication Data

US 2014/0258355 A1  Sep. 11, 2014

(51) Int. Cl.  
G06F 17/18 (2006.01)  
G06Q 10/06 (2012.01)

(52) U.S. Cl.  
CPC .............. *G06F 17/18* (2013.01); *G06Q 10/06* (2013.01); *G06Q 10/067* (2013.01)

(58) Field of Classification Search  
USPC .......................................................... 703/2  
See application file for complete search history.

(56) References Cited

U.S. PATENT DOCUMENTS

| | | | |
|---|---|---|---|
| 5,452,410 A * | 9/1995 | Magidson | G06F 17/18 345/440 |
| 7,933,851 B2 | 4/2011 | Tuv | |
| 8,165,853 B2 | 4/2012 | Pinto et al. | |
| 8,170,841 B2 | 5/2012 | Pinto et al. | |
| 2004/0138826 A1 * | 7/2004 | Carter et al. | 702/27 |
| 2008/0109272 A1 | 5/2008 | Sheopuri et al. | |
| 2009/0319244 A1 | 12/2009 | West et al. | |
| 2011/0046924 A1 | 2/2011 | Natarajan | |
| 2011/0137842 A1 | 6/2011 | Rotondo | |
| 2012/0078582 A1 | 3/2012 | Duncan Mattson et al. | |
| 2012/0197608 A1 | 8/2012 | Pinto et al. | |
| 2012/0239375 A1 | 9/2012 | Laxmanan et al. | |

OTHER PUBLICATIONS

Monlenberghs, Geert & Verbeke, Geert "Meaningful Statistical Model Formulations for Repeated Measures" Statistica Sinica, vol. 14, pp. 989-1020 (2004).*

(Continued)

*Primary Examiner* — Kamini S Shah  
*Assistant Examiner* — Jay B Hann  
(74) *Attorney, Agent, or Firm* — Janaki K. Davda; Konrad, Raynes, Davda & Victor LLP

(57) ABSTRACT

Provided are techniques for interaction detection for generalized linear models. Basic statistics are calculated for a pair of categorical predictor variables and a target variable from a dataset during a single pass over the dataset. It is determined whether there is a significant interaction effect for the pair of categorical predictor variables on the target variable by: calculating a log-likelihood value for a full generalized linear model without estimating model parameters; calculating the model parameters for a reduced generalized linear model with a recursive marginal mean accumulation technique using the basic statistics; calculating a log-likelihood value for the reduced generalized linear model; calculating a likelihood ratio test statistic using the log-likelihood value for the full generalized linear model and the log-likelihood value for the reduced generalized linear model; calculating a p-value of the likelihood ratio test statistic; and comparing the p-value to a significance level.

14 Claims, 11 Drawing Sheets

(56) References Cited

OTHER PUBLICATIONS

Preliminary Amendment, Sep. 15, 2014, for U.S. Appl. No. 14/486,659, filed Sep. 15, 2014 by Y.J. Chu et al., Total 5 pp. [57.306C1 (PrelimAmend)].

U.S. Appl. No. 14/486,659, filed Sep. 15, 2014, entitled, "Interaction Detection for Generalized Linear Models", invented by Y.J. Chu et al., Total 38 pp. [57.306C1 (Appln)].

Jaeger, T.F., "Categorical Data Analysis: Away from ANOVAs (transformation or not) and Towards Logit Mixed Models", Journal of Memory and Language 59(2008), Mar. 14, 2007, © 2007 Elsevier Inc., pp. 434-446. [Also Total 13 pp.].

McCullagh, P. and J.A. Nelder, "Generalized Linear Models", 1989, Second Edition, London: Chapman and Hall, Total 20 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Nelder, J.A. and R.W.M. Wedderburn, "Generalized Linear Models", Journal of the Royal Statistical Society. Series A (General), vol. 135, No. 3 (1972), 370-384. [Also Total 16 pp.].

Sorokina, D., "Modeling Additive Structure and Detecting Interactions with Groves of Trees", Cornell University, Doctor of Philosophy Dissertation, Aug. 2008, pp. 1-120. [Also Total 120 pp.].

U.S. Appl. No. 13/562,201, filed Jul. 30, 2012, entitled, "Relationship Discovery in Business Analytics", invented by Chu, Y.J., S. Han, J. Shyr, D. Spisic, and X. Zhang, Total 61 pp. [54.84 (Appln)].

Wedderburn, R.W.M., "Quasi-likelihood Functions, Generalized Linear Models, and the Gauss-Newton Method", [online]. Retrieved from the Internet at <URL: http://biostat.georgiahealth.edu/~dryu/course/stat9110spring12/land12_ref1.pdf>, Biometrika (1974), 61, 3, 439, Total 9 pp.

Wei, W.H., "Chapter 8 Model Checking", [online], Section 8.2. Retrieved from the Internet at <URL: http://web.thu.edu.tw/wenwei/www/Courses/glm/ch8.0.pdf>, 2005, Date of Visit: Sep. 5, 2012, Total 7 pp.

Wood, S., "Generalized Linear Models", [online]. Retrieved from the Internet at <URL: http://people.bath.ac.uk/sw283/mgcv/tampere/glm.pdf>, 2010, Date of Visit: Sep. 5, 2012, Total 26 pp.

\* cited by examiner

TABLE 1                              300

| Target variable distribution | Link function |
|---|---|
| Normal | Identity, Log, Power |
| Inverse Gaussian | Identity, Log, Power |
| Gamma | Identity, Log, Power |
| Poisson | Identity, Log, Power |
| Binomial | Logit, Probit, Complementary log-log |
| Nominal Multinomial | Logit |

FIG. 3

Table 2

| Target variable's distribution | Basic statistics |
|---|---|
| Normal | - $R$, the number of categories for categorical predictor $X_1$<br>- $S$, the number of categories for categorical predictor $X_2$<br>- $N_{ij}$, the number of records in the combination of $X_1 = i$ and $X_2 = j$<br>- $\bar{y}_{ij}$, the target variable mean in the combination of $X_1 = i$ and $X_2 = j$ |
| Inverse Gaussian | |
| Gamma | |
| Poisson | - $v_{ij}$, the target variable variance in the combination of $X_1 = i$ and $X_2 = j$ |
| Binomial | |
| Nominal Multinomial | - $R$, the number of categories for categorical predictor $X_1$<br>- $S$, the number of categories for categorical predictor $X_2$<br>- $K$, the number of categories of target variable $y$<br>- $N_{ij,k}$, the total number of records for the $k^{th}$ target variable category in the combination of $X_1 = i$ and $X_2 = j$<br>- $N_{ij}$, the total number of records in the combination of $X_1 = i$ and $X_2 = j$<br>- $\bar{y}_{ij,k}$, the proportion of the $k^{th}$ target variable category in the combination of $X_1 = i$ and $X_2 = j$, i.e. $\bar{y}_{ij,k} = N_{ij,k} / N_{ij}$ |

FIG. 4

Table 3

| Target variable distribution | Condensed log-likelihood |
|---|---|
| Normal | $\ell = -\frac{1}{2}\sum_{i=1}^{R}\sum_{j=1}^{S} N_{ij}(\bar{y}_{ij} - \mu_{ij})^2$ |
| Inverse Gaussian | $\ell = -\frac{1}{2}\sum_{i=1}^{R}\sum_{j=1}^{S} N_{ij}\left(\frac{\bar{y}_{ij} - 2\mu_{ij}}{\mu_{ij}^2}\right)$ |
| Gamma | $\ell = -\sum_{i=1}^{R}\sum_{j=1}^{S} N_{ij}\left(\ln \mu_{ij} + \frac{\bar{y}_{ij}}{\mu_{ij}}\right)$ |
| Poisson | $\ell = \sum_{i=1}^{R}\sum_{j=1}^{S} N_{ij}(\bar{y}_{ij}\ln(\mu_{ij}) - \mu_{ij})$ |
| Binomial | $\ell = \sum_{i=1}^{R}\sum_{j=1}^{S} N_{ij}(\bar{y}_{ij}\ln(\mu_{ij}) + (1 - \bar{y}_{ij})\ln(1 - \mu_{ij}))$ |
| Nominal Multinomial | $\ell = \sum_{i=1}^{R}\sum_{j=1}^{S}\sum_{k=1}^{K} N_{ij,k} \times \ln(\mu_{ij,k})$ |

FIG. 5

Table 4

FIG. 7

Table 5

| Link function | $\eta = g(\mu)$ | Inverse $\mu = g^{-1}(\eta)$ | First derivative $g'(\mu) = \frac{\partial \eta}{\partial \mu} = \Delta$ | Second derivative $g''(\mu) = \frac{\partial^2 \eta}{\partial \mu^2}$ |
|---|---|---|---|---|
| Identity | $\mu$ | $\eta$ | $1$ | $0$ |
| Log | $\ln(\mu)$ | $\exp(\eta)$ | $\frac{1}{\mu}$ | $-\Delta^2$ |
| Power($\alpha$) $\begin{cases}\alpha \neq 0 \\ \alpha = 0\end{cases}$ | $\begin{cases}\mu^\alpha \\ \ln(\mu)\end{cases}$ | $\begin{cases}\eta^{1/\alpha} \\ \exp(\eta)\end{cases}$ | $\begin{cases}\alpha\mu^{\alpha-1} \\ \frac{1}{\mu}\end{cases}$ | $\begin{cases}\Delta\frac{\alpha-1}{\mu} \\ -\Delta^2\end{cases}$ |
| Logit | $\ln\left(\frac{\mu}{1-\mu}\right)$ | $\frac{\exp(\eta)}{1+\exp(\eta)}$ | $\frac{1}{\mu(1-\mu)}$ | $\Delta^2(2\mu-1)$ |
| Probit | $\Phi^{-1}(\mu)$, where $\Phi(\xi) = \frac{1}{\sqrt{2\pi}}\int_{-\infty}^{\xi} e^{-z^2/2}dz$ | $\Phi(\eta)$ | $\frac{1}{\phi(\Phi^{-1}(\mu))}$, where $\phi(z) = \frac{1}{\sqrt{2\pi}}e^{-z^2/2}$ | $\Delta^2 \Phi^{-1}(\mu)$ |
| Complementary log-log | $\ln(-\ln(1-\mu))$ | $1-\exp(-\exp(\eta))$ | $\frac{1}{(\mu-1)\ln(1-\mu)}$ | $-\Delta^2(1+\ln(1-\mu))$ |

INTERACTION DETECTION FOR GENERALIZED LINEAR MODELS FOR A PURCHASE DECISION

FIELD

Embodiments of the invention relate to interaction detection for generalized linear models.

BACKGROUND

Business analysts like to know which factors (e.g., categorical predictors) impact a target variable of interest and by how much the factors impact the target variable. A target variable may be described as a field that is predicted or influenced by one or more of the factors in a model. A categorical predictor may be described as a field that has a finite number of nominal or ordinal categories as values.

A linear regression model may be used to answer such questions from business analysts. Furthermore, in many business scenarios, the interaction between factors may be relevant.

An Analysis of Variance (ANOVA) technique works in linear regression models that assume the target variable follows a normal distribution and the linear relationship exists between the target variable and factors, but the ANOVA technique is not applicable in more general models.

As an example, a software company wants to determine which characteristics of customers will affect their decision to buy or not to buy a product. For this example, a logistic regression model is more appropriate because the target variable (buy or not to buy a product) is binary, a Bernoulli distribution is used, and the mean of the target variable is to be between 0 and 1 (so a function of the target variable mean is assumed to be linearly related to factors, which is called a "logit link function").

As another example, if or when a car insurance company wants to analyze which factors contribute the most to customer's claim size, then a seasoned analyst knows to fit a gamma regression to damage claims for cars because it is more appropriate to the analysis of positive range data by using a gamma distribution and an inverse link function to relate the mean of the target variable to a linear combination of the factors.

In a further example, a shipping company is concerned about damage to cargo ships caused by waves and wants to determine which factors (such as ship types, years of construction, etc.) are more prone to damage, then the incident counts are modeled as occurring at a Poisson rate and a log-linear model (with a Poisson distribution and a log link function) is used.

Many such general models belong to so called "generalized linear models". The generalized linear model expands the linear regression model so that the target variable is linearly related to the predictors via a specified link function. Moreover, the generalized linear model allows for the target variable to have a non-normal distribution.

Because the ANOVA technique is not applicable in generalized linear models, a likelihood ratio test may be used to detect interaction. The likelihood ratio test compares log-likelihood values between the full and reduced generalized linear models. For a two-way interaction, the full model includes two factors (also called "main effects") and an interaction effect, while the reduced model includes two main effects (without an interaction effect). Computation of log-likelihood value in the reduced model is an iterative process and requires many data passes.

SUMMARY

Provided is a method for interaction detection for generalized linear models. Certain embodiments provide a two-way interaction detection in which basic statistics are calculated for a pair of categorical predictor variables and a target variable from a dataset during a single pass over the dataset. It is determined whether there is a significant interaction effect for the pair of categorical predictor variables on the target variable by: calculating a log-likelihood value for a full generalized linear model without estimating model parameters; calculating the model parameters for a reduced generalized linear model with a recursive marginal mean accumulation technique using the basic statistics; calculating a log-likelihood value for the reduced generalized linear model; calculating a likelihood ratio test statistic using the log-likelihood value for the full generalized linear model and the log-likelihood value for the reduced generalized linear model; calculating a p-value of the likelihood ratio test statistic; and comparing the p-value to a significance level.

In certain embodiments, m-way interaction detection is performed among multiple possible combinations of m categorical predictor variables, where m≥2, wherein the dataset contains predictor variables, and the basic statistics for each of the possible combinations are calculated during a single pass over the dataset.

Also provided is a computer program product for interaction detection for generalized linear models. The computer program product comprises a computer readable storage medium having program code embodied therewith, the program code executable by at least one processor to calculate, by the at least one processor, basic statistics for a pair of categorical predictor variables and a target variable from a dataset during a single pass over the dataset; and determine, by the at least one processor, whether there is a significant interaction effect for the pair of categorical predictor variables on the target variable by: calculating, by the at least one processor, a log-likelihood value for a full generalized linear model without estimating model parameters, calculating, by the at least one processor, the model parameters for a reduced generalized linear model with a recursive marginal mean accumulation technique using the basic statistics, calculating, by the at least one processor, a log-likelihood value for the reduced generalized linear model, calculating, by the at least one processor, a likelihood ratio test statistic using the log-likelihood value for the full generalized linear model and the log-likelihood value for the reduced generalized linear model, calculating, by the at least one processor, a p-value of the likelihood ratio test statistic, and comparing, by the at least one processor, the p-value to a significance level.

Moreover, provided is a computer system for interaction detection for generalized linear models. The computer system includes one or more processors, one or more computer-readable memories and one or more computer-readable, tangible storage devices, and program instructions, stored on at least one of the one or more storage devices for execution by at least one of the one or more processors via at least one of the one or more memories, to: calculate basic statistics for a pair of categorical predictor variables and a target variable from a dataset during a single pass over the dataset; and determine whether there is a significant interaction effect for the pair of categorical predictor variables on the target variable by: calculating a log-likelihood value for a full generalized linear model without estimating model parameters, calculating the model parameters for a reduced generalized linear model with a recursive marginal mean accumulation technique using the basic statistics, calculating a log-likelihood value for the reduced generalized linear model, calculating a likelihood ratio test statistic using the log-likelihood value for the full generalized linear model and the log-likelihood value for the reduced generalized linear model, calculating a p-value of the likelihood ratio test statistic, and comparing the p-value to a significance level.

BRIEF DESCRIPTION OF THE SEVERAL VIEWS OF THE DRAWINGS

Referring now to the drawings in which like reference numbers represent corresponding parts throughout:

FIG. 3 illustrates, in Table 1, example target variable distributions and link functions for the distributions in accordance with certain embodiments.

FIG. 4 illustrates Table 2, which shows, for a pair of categorical predictors, $X_1$ and $X_2$, a list of statistics to be collected and computed in accordance with certain embodiments.

FIG. 5 illustrates Table 3, which shows that the formulae for computing the values of the log-likelihood functions in accordance with certain embodiments.

FIG. 7 illustrates, in Table 5, some commonly used link functions, the inverse forms, and the first and second derivatives in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide a technique to detect possible multiplicative interaction effects for generalized linear predictive models based on basic statistics computed in a single data pass. For large and distributed data sources, a map-reduce approach may be used.

Figure 1:
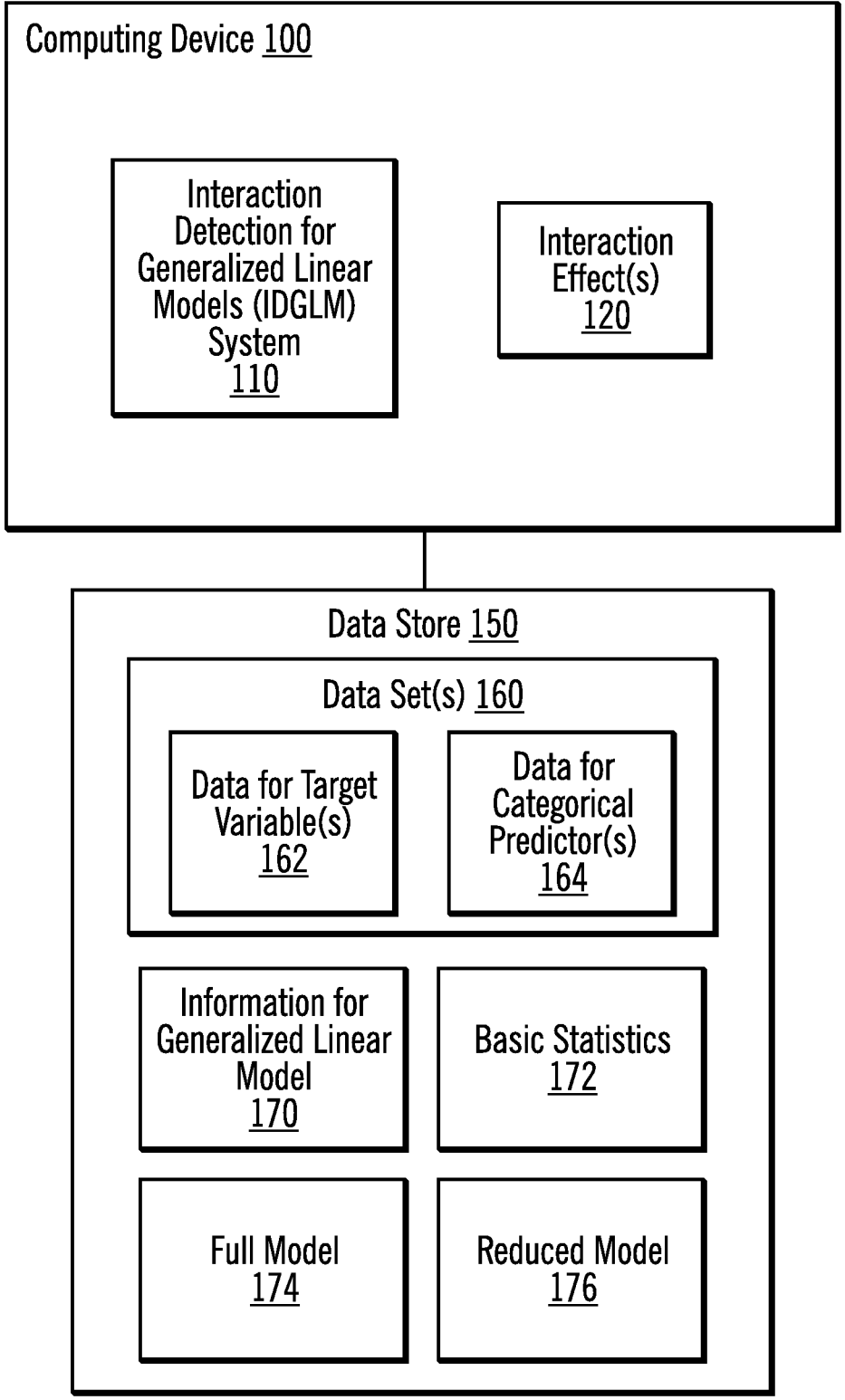
FIG. 1 illustrates a computing architecture in accordance with certain embodiments.

FIG. 1 illustrates a computing architecture in accordance with certain embodiments. Computing device 100 includes Interaction Detection for Generalized Linear Models (IDGLM) system 110 that outputs one or more significant interaction effects 120. A significant interaction effect (also referred to as a statistically significant interaction effect) may be interpreted as an interaction effect has an impact on a target based on a pattern (rather than by chance).

Computing device 100 is coupled to data store 150. Data store 150 includes one or more data sets 160, information for a generalized linear model 170, basic statistics 172, full model 174, and reduced model 176. Each data set 160 includes data for one or more target variables 162 and/or data for one or more categorical predictors 164.

Figure 2:
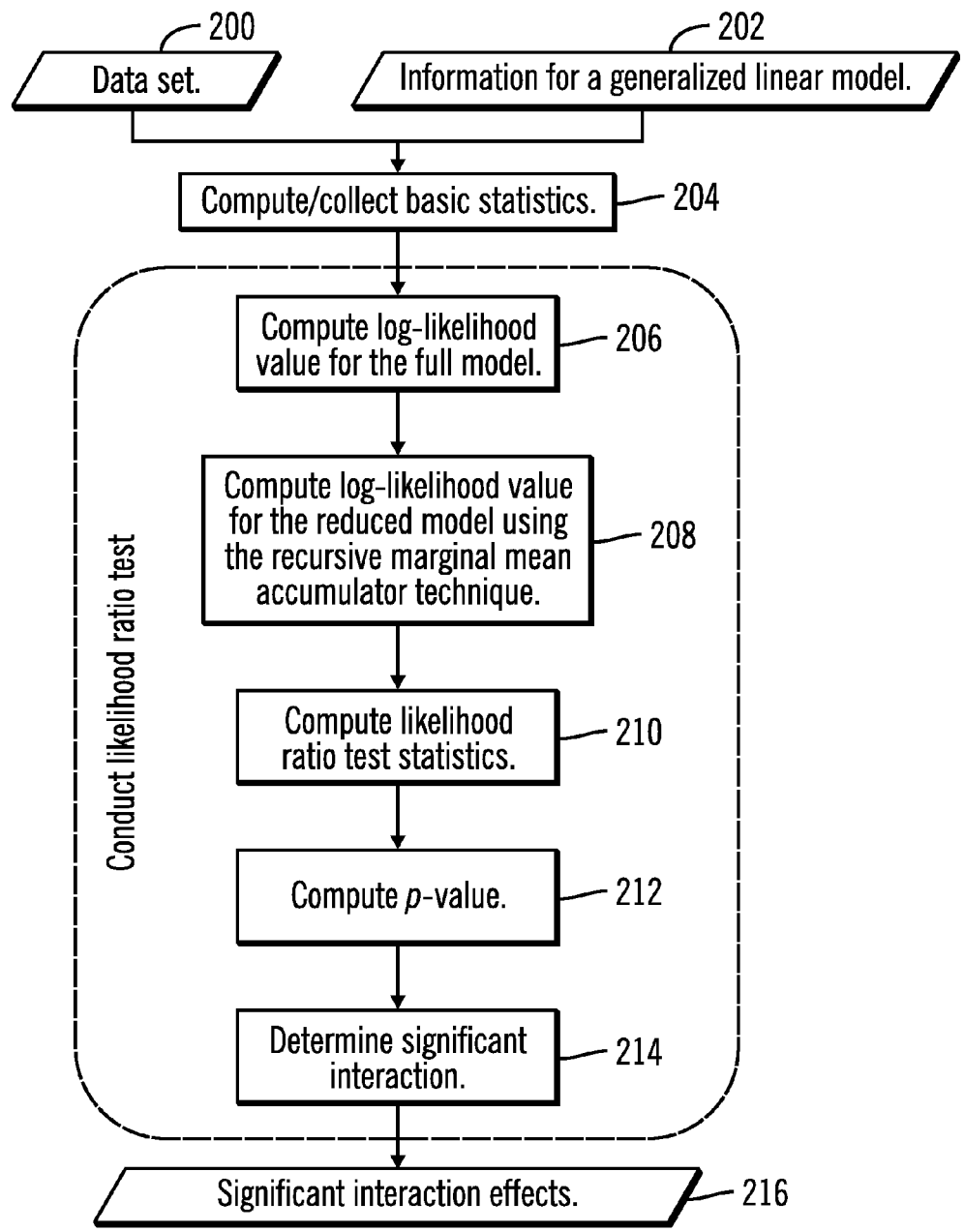
FIG. 2 illustrates, in a flow diagram, a two-way interaction detection process in accordance with certain embodiments.

FIG. 2 illustrates, in a flow diagram, a two-way interaction detection process in accordance with certain embodiments. IDGLM system 110 receives data set 200 (that includes the data for a target variable and the data for a set of categorical predictors) and information for generalized linear model 202 (including a distribution and a link function) to perform a two-way interaction detection process.

In block 204, IDGLM system 110 computes and/or collects basic statistics. In certain embodiments, IDGLM system 110 computes and/or collects basic statistics for the target variable and each pair of two categorical predictors for possible predictors in a single data pass.

In blocks 206-214, IDGLM system 110 conducts a likelihood ratio test. In particular, for each pair of categorical predictors, IDGLM system 110 conducts a likelihood ratio test between the full model (two main effects and an interaction effect) and the reduced model (excluding the interaction effect under the null hypothesis of no interaction effect).

In block 206, IDGLM system 110 computes the log-likelihood value for the full model. In certain embodiments, IDGLM system 110 computes the log-likelihood value for the full model based on the basic statistics (computed in block 204) without estimating parameters.

In block 208, IDGLM system 110 computes the log-likelihood value for the reduced model using a recursive marginal mean accumulation technique. In certain embodiments, IDGLM system 110 estimates parameters for the reduced model with the recursive marginal mean accumulation technique based on the basic statistics (computed in block 204), and, during the iterative process of parameter estimation, the log-likelihood value for the reduced model is also computed.

In block 210, IDGLM system 110 computes likelihood ratio test statistics. In certain embodiment, IDGLM system 110 computes likelihood ratio test statistics as two times the difference between two log-likelihood values.

In block 212, IDGLM system 110 computes a p-value. In certain embodiments, IDGLM system 110 computes the p-value for the likelihood ratio test statistic based on a chi-squared distribution.

In block 214, IDGLM system 110 determines significant interaction. In certain embodiments, IDGLM system 110 determines whether an interaction effect for the pair of categorical predictors is significant.

IDGLM system 110 outputs significant interaction effects 216 (e.g., in a list), which may be used for subsequent analyses.

Although traditionally, parameter estimation for the reduced model in block 208 needs many data passes, IDGLM system 110 avoids many data passes with a "recursive marginal mean accumulation" technique to estimate parameters, which use basic statistics computed in a single data pass. Therefore, IDGLM system 110 performs a single data pass to detect possible multiplicative interaction effects for generalized linear models.

Furthermore, IDGLM system 110 is able to extend the two-way to m-way interaction detection, where m>2. In principle, the basic statistics for m categorical predictors with the target variable may be collected and computed in a single data pass. Then likelihood ratio test statistics are computed based only on these basic statistics.

In certain embodiments, the interaction detection focuses on the generalized linear model. Thus, merely to enhance understanding, a brief introduction of the generalized linear model is provided.

Generalized Linear Model

A generalized linear model of a target variable y with a set of categorical predictors X has the form shown in Equation (1):

$$\eta = g(E(y)) = g(\mu) = X\beta, \quad y \sim F, \qquad (1)$$

where $\eta$ is the linear predictor; $g(\bullet)$ is the monotonic differentiable link function which states how the expected value or mean of y, $E(y)=\mu$, is related to the linear predictor $\eta$; F is the target variable's probability distribution.

Choosing different combinations of a proper probability distribution and a link function may result in different models. FIG. 3 illustrates, in Table 1 300, example target variable distributions and link functions for the distributions in accordance with certain embodiments. Embodiments are not limited to these examples. Embodiments may be applied to any target variable distribution that belongs to the exponential family of distributions and any link function that is monotonic differentiable.

For each pair of categorical predictors, say $X_1$ and $X_2$, IDGLM system 110 tests whether the multiplicative interaction effect $X_1 \times X_2$ is significant in the following full model shown in Equation (2):

$$\eta = g(\mu) = X_1\beta_1 + X_2\beta_2 + (X_1 \times X_2)\beta_3 \qquad (2)$$

In certain embodiments, if the null hypothesis $H_0: \beta_3 = 0$ is not rejected, then the interaction effect $X_1 \times X_2$ is not considered in the subsequent analyses and it becomes the following reduced model shown in Equation (3):

$$\eta = g(\mu) = X_1\beta_1 + X_2\beta_2 \qquad (3)$$

In certain embodiments, if some categorical predictors are continuous, then they are transformed to categorical by a technique, such as the equal width technique, the equal frequency technique or other techniques. This transformation may need a data pass.

In certain embodiments, the interaction detection process consists of the following two processes:

1. Collect and compute basic statistics among the target variable and each pair of categorical predictors for all possible categorical predictors in a single data pass. For large and distributed data sources, a map-reduce approach may be used. FIG. 4 illustrates Table 2 400, which shows, for a pair of $x_1$ and $x_2$, a list of statistics to be collected and computed in accordance with certain embodiments.

2. For each pair of categorical predictors, conduct a likelihood ratio test with the null hypothesis $H_0: \beta_3 = 0$ in the following 5 sub-processes:

2.1 Compute the log-likelihood value for the full model based on statistics in process (1) without estimating parameters. Denote it as $l_{full}$.

2.2 Estimate parameters for the reduced model with the recursive marginal mean accumulation technique based on statistics in process (1). During the iterative process of parameter estimation, the log-likelihood value for the reduced model is also computed. Denote it as $l_{reduced}$ 2.3 Compute the likelihood ratio test statistic: $\chi^2 = 2(l_{full} - l_{reduced})$.

2.4 Compute the p-value: $p = 1 - Pr(\chi_{df}^2 \leq \chi^2)$, where $\chi_{df}^2$ is a random variable that follows a chi-squared distribution with df degrees of freedom, and df is the difference of the number of parameters between the full model and the reduced model.

2.5 If $p < \alpha$, where $\alpha$ is a significant level (the default is 0.05) then the interaction effect $X_1 \times X_2$ is significant and will be included in the subsequent analyses.

Log-Likelihood Computation

The log-likelihood functions may be different for different distributions. FIG. 5 illustrates Table 3 500, which shows that the formulae for computing the values of the condensed log-likelihood functions in accordance with certain embodiments. With the condensed log-likelihood function, some terms are omitted from the whole log-likelihood function because these terms are the same for the full and reduced models thus do not affect the likelihood ratio test statistics.

In certain embodiments, for the full model, the expectation of y in each cell, $\mu_{ij}$ or $\mu_{ij,k}$, is replaced by $\bar{y}_{ij}$ or $\bar{y}_{ij,k}$, respectively.

In certain embodiments, for the reduced model, $\mu_{ij}$ or $\mu_{ij,k}$ or is computed together with parameters estimation using the recursive marginal mean accumulation technique.

Recursive Marginal Mean Accumulation Technique

To compute the log-likelihood value for the reduced model, Equation (3), IDGLM system 110 estimates parameters in the reduced model. In certain embodiments, since there is no closed form solution, unless it is a linear model (distribution is normal and link function is identity), the parameters can be estimated by using the maximum likelihood technique. The common techniques used are the Newton type technique, in which the first derivative (gradient) and/or second derivative (Hessian) are needed to update the parameters, or Iteratively Reweighted Least Squares (IRLS) technique, in which the "pseudo" target variable and weights are generated to do a weighted least square regression. Typically, both techniques are iterative processes in which each iteration performs one pass through the data. In certain embodiments, IDGLM system 110 provides a new "recursive marginal mean accumulation" technique, which is a doubly iterative process where: 1) updating parameters is iterative and 2) computing search direction is iterative. However, then recursive marginal mean accumulation does not need a data pass.

Equation (3) for many distributions (except nominal multinomial, which will be discussed below) may be simplified, for the combination of $X_1 = i$ and $X_2 = j$, as shown in Equation (4):

$$\eta_{ij} = g(\mu_{ij}) = \alpha_i + \gamma_j \qquad (4)$$

where $\alpha_i$ and $\gamma_j$ are the parameters for $X_1 = i$ and $X_2 = j$, respectively, and can be called "row parameter" and "column parameter", because their increments are computed by the row marginal mean and column marginal mean of a two-way table.

The doubly iterative process is described with the follow operations:

(a) Set the initial values of $\alpha_i$ and $\gamma_j$ to be 0, for $i = 1, \ldots, R$ and $j = 1, \ldots, S$, and compute initial value of $\mu_{ij} = g(\alpha_i + \gamma_j)^{-1}$, see Table 5 in FIG. 7 for the corresponding inverse forms, $g(\bullet)^{-1}$.

(b) Compute the initial log-likelihood value by plugging initial values of $\mu_{ij}$ into formulae in Table 3 (FIG. 5).

(c) A R×S two-way table is created with the elements $w_{ij}$ and $s_{ij}$ in each cell, where, as shown in Equation (5) and Equation (6):

$$w_{ij} = \frac{N_{ij}}{V(\mu_{ij})(g'(\mu_{ij}))^2} + N_{ij}(\overline{y}_{ij} - \mu_{ij}) \times \frac{V(\mu_{ij})g''(\mu_{ij}) + V'(\mu_{ij})g'(\mu_{ij})}{(V(\mu_{ij}))^2(g'(\mu_{ij}))^3} \quad (5)$$

and $$s_{ij} = \frac{1}{w_{ij}} \times \frac{N_{ij}(\overline{y}_{ij} - \mu_{ij})}{V(\mu_{ij})g'(\mu_{ij})} \quad (6)$$

and $V(\mu_{ij})$ is the variance function, $V'(\mu_{ij})$ is the first derivative of $V(\mu_{ij})$, and $g'(\mu_{ij})$ $g''(\mu_{ij})$ are the first and second derivatives of the link function, $g(\mu_{ij})$, respectively.

Figure 6:
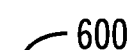
FIG. 6 illustrates, in Table 4, distributions, variance functions, and first derivatives in accordance with certain embodiments.

FIG. 6 illustrates, in Table 4 600, distributions, variance functions, and first derivatives in accordance with certain embodiments. In particular, Table 4 lists the variance functions and the corresponding first derivatives for distributions, except nominal multinomial. FIG. 7 illustrates, in Table 5 700, some commonly used link functions, the inverse forms, and the first and second derivatives in accordance with certain embodiments.

(d) Compute the search directions, $d\alpha_i$ and $d\gamma_j$, for row and column parameters, iteratively, by the following sub-operations:

(d-1) Set the initial values of $d\alpha_i$ and $d\gamma_j$ to be 0.

(d-2) Update the search direction for row parameter by adding the marginal mean of the corresponding row as shown in Equation (7):

$$d\alpha_i = d\alpha_i + s_{i\bullet}, \quad (7)$$

where $s_{i\bullet}$, is the weighted marginal mean of $s_{ij}$ for row i, i=1, . . . , R, as shown in Equation (8):

$$s_{i\bullet} = \frac{\sum_{j=1}^{S} w_{ij} \times s_{ij}}{\sum_{j=1}^{S} w_{ij}}. \quad (8)$$

(d-3) Update the two-way table by subtracting row marginal mean for each row as shown in Equation (9):

$$s_{ij} = s_{ij} - s_{i\bullet}. \quad (9)$$

(d-4) Update the search direction for column parameter by adding the marginal mean of the corresponding column as shown in Equation (10):

$$d\gamma_j = d\gamma_j + s_{\bullet j} \quad (10)$$

where $s_{\bullet j}$ is the weighted marginal mean of $s_{ij}$ for column j, j=1, . . . , S, as shown in Equation (11):

$$s_{\bullet j} = \frac{\sum_{i=1}^{R} w_{ij} \times s_{ij}}{\sum_{i=1}^{R} w_{ij}}. \quad (11)$$

(d-5) Update the two-way table by subtracting column marginal mean for each column as shown in Equation (12):

$$s_{ij} = s_{ij} - s_{\bullet j}. \quad (12)$$

(d-6) Check whether the search directions converge by the following criterion $$\max(|s_{i\bullet}|, |s_{\bullet j}|) < \epsilon_1,$$

where $\epsilon_i$ is a specified tolerance level.

If the criterion is not met, go back to (d-2), otherwise go to (e).

(e) Update the row and column parameters as shown in Equation (13):

$$\alpha_i = \alpha_i + \xi \times d\alpha_i, \text{ and}$$

$$\gamma_j = \gamma_j + \xi \times d\gamma_j, \quad (13)$$

where $\xi$ is a step length in a line search technique.

(f) Compute the log-likelihood value with the updated target variable mean which is computed with the updated parameter estimates.

(g) Check whether the parameters converge: the absolute difference of log-likelihood values in two successive iterations is less than a specified tolerance level, say $\epsilon_2$, which can be different from $\epsilon_1$.

(h) If the criterion is not met, go back to (c), otherwise stop and output the final log-likelihood value.

Note that for nominal multinomial, computation is more complex in the following operations:

(a) The estimated expectations for each category of the target variable as shown in Equation (14):

$$\pi_{ij,k} = \begin{cases} \dfrac{\exp(\alpha_{ik} + \gamma_{jk})}{1 + \sum_{k=1}^{K-1} \exp(\alpha_{ik} + \gamma_{jk})}, & k = 1, \ldots, K-1, \\ \dfrac{1}{1 + \sum_{k=1}^{K-1} \exp(\alpha_{ik} + \gamma_{jk})}, & k = K \end{cases} \quad (14)$$

(b) The log-likelihood value as shown in Equation (15):

$$\sum_{i=1}^{R} \sum_{j=1}^{S} \sum_{k=1}^{K} N_{ij,k} \times \ln(\pi_{ij,k}) \quad (15)$$

(c) In the R×S two-way table, $w_{ij}$ is extended from a scalar to a matrix and $s_{ij}$ to a vector as shown in Equation (16) and Equation (17):

$$w_{ij} = N_{ij}(\text{diag}(\pi_{ij}) - \pi_{ij} \times \pi_{ij}^T) \text{ and} \quad (16)$$

$$s_{ij} = N_{ij} w_{ij}^{-1} (\overline{y}_{ij} - \pi_{ij}), \quad (17)$$

where $\pi_{ij}^T = (\pi_{ij,1}, \ldots, \pi_{ij,K-1})$ and $\overline{y}_{ij}^T = (\overline{y}_{ij,1}, \ldots, \overline{y}_{ij,K-1})$.

(d) The search directions, $d\alpha_i$ and $d\gamma_j$, are extended to vectors, $d\alpha_i$ and $d\gamma_j$.

The weighted marginal means of $s_{ij}$ for row i, i=1, . . . , R, and for column j, j=1, . . . , S, are extended to vectors as shown in Equation (18) and Equation (19):

$$s_{i\bullet} = \left(\sum_{j=1}^{S} w_{ij}\right)^{-1} \times \left(\sum_{j=1}^{S} w_{ij} \times s_{ij}\right) \tag{18}$$

and $$s_{\bullet j} = \left(\sum_{i=1}^{R} w_{ij}\right)^{-1} \times \left(\sum_{i=1}^{R} w_{ij} \times s_{ij}\right). \tag{19}$$

(e) The parameters, $\alpha_i$ and $\gamma_j$, are extended to vectors, $\alpha_i$ and $\gamma_j$.

Figure 8:
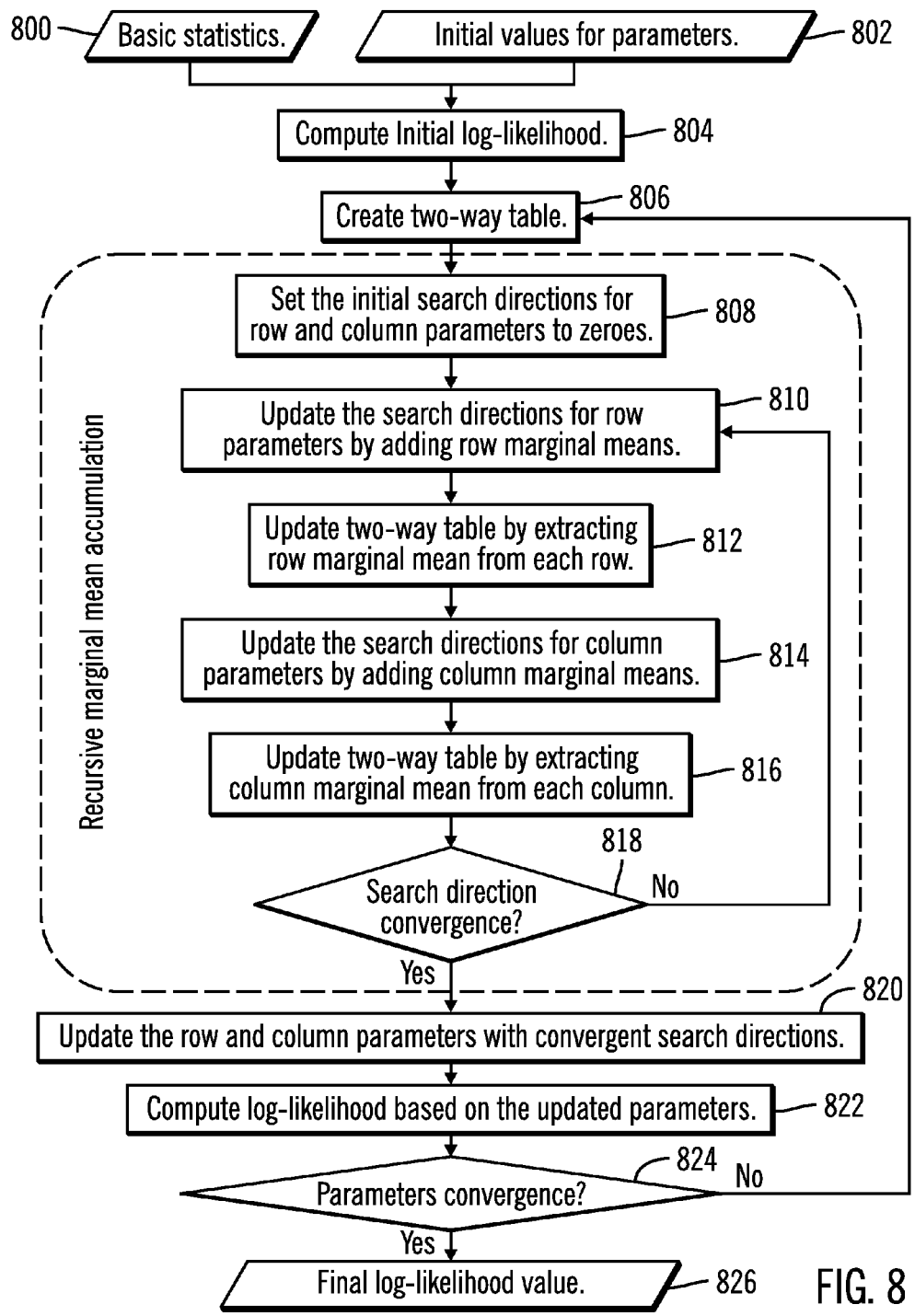
FIG. 8 illustrates, in a flow diagram, a recursive marginal mean accumulation technique, which is a doubly iterative process, in accordance with certain embodiments.

FIG. 8 illustrates, in a flow diagram, a recursive marginal mean accumulation technique, which is a doubly iterative process, in accordance with certain embodiments. IDGLM system 110 receives basic statistics 800 and initial values for parameters 802 (operation (a) of the doubly iterative process). In block 804, IDGLM system 110 computes an initial log likelihood (operation (b) of the doubly iterative process). In block 806, IDGLM system 110 creates a two-way table (operation (c) of the doubly iterative process).

In blocks 808-818, IDGLM system 110 performs the recursive marginal mean accumulation (operation (d) of the doubly iterative process). In particular, in block 808, IDGLM system 110 sets the initial search directions for row and column parameters to zeros (operation (d-1) of the doubly iterative process). In block 810, IDGLM system 110 updates the search directions for row parameters by adding row marginal means to the current search directions for row parameters (operation (d-2) of the doubly iterative process). In block 812, IDGLM system 110 updates the two-way table by extracting the row marginal mean from each row (operation (d-3) of the doubly iterative process). In block 814, IDGLM system 110 updates the search direction for column parameters by adding column marginal means (operation (d-4) of the doubly iterative process). In block 816, IDGLM system 110 updates the two-way table by extracting column marginal mean from each column (operation (d-5) of the doubly iterative process). In block 818, IDGLM system 110 determines whether there is search direction convergence (operation (d-6) of the doubly iterative process). If so, processing continues to block 820, otherwise, processing loops back to block 810.

In block 820, IDGLM system 110 updates the row and column parameters (operation (e) of the doubly iterative process). In block 822, IDGLM system 110 computes the log-likelihood based on the updated parameters (operation (f) of the doubly iterative process). In block 824, IDGLM system 110 determines whether there is parameters convergence (operation (g) of the doubly iterative process). If so, processing continues to output final log-likelihood value 826, otherwise, processing loops to block 806 (operation (h) of the doubly iterative process).

Extension to m-Way Interaction Detection

The two-way interaction detection technique may be extended to m-way interaction detection. The full model then contains all the main effects, two-way interaction effects, ..., and m-way interaction effects. The reduced model is the model that the m-way interaction effect excludes from the full model. The likelihood ratio test is used to test whether an m-way interaction effect is significant. Similar to the situation of two-way interaction detection, the basic statistics between the target variable and m categorical predictors are collected first. Then the log-likelihood value of the full model is computed based on these basic statistics. For the reduced model, the extended recursive marginal mean accumulation technique for computation of the log-likelihood is described as follows:

(a) Set initial parameters corresponding to all main effects, two-way interaction effects, ..., and (m−1)-way interaction effects to be 0.
(b) Compute the initial log-likelihood value based on initial parameters.
(c) Similar to the two-way interaction detection, create an m-way table.
(d) Compute the search directions iteratively by the following iterative operations:
   (d-1) Set the initial search directions of one-way main effects, two-way interaction effects, ..., (m−1)-way interaction effects to be 0.
   (d-2) Select one dimension in the m-way table, then update corresponding search direction of one-way main effect by adding the marginal mean of this dimension, and update the m-way table by subtracting the marginal mean of this dimension. Such process is repeated for each of other main effects.
   (d-3) Select two dimensions in the m-way table, then update corresponding search direction of two-way interaction effect by adding the marginal mean of the two-dimensional table, and update the m-way table by subtracting the marginal mean of the two-dimensional table. Such process is repeated for each of other two-way interaction effects.
   (d-4) Similar to (d-2) or (d-3), update the search directions from three-way to (m−1)-way interaction effects.
   (d-5) Check whether the search directions converge: if the maximum absolute marginal mean of all marginal means from one-way main effects to (m−1)-way interaction effects is less than a tolerance level. If the criterion is met, then go to the operation (e), otherwise go back to operation (d-2).
(e) Similar to the operation (e) in the two-way interaction detection, update the parameters from one-way main effects to (m−1)-way interaction effects.
(f) Compute the log-likelihood value with the updated target variable mean which is computed with the updated parameter estimates.
(g) Check whether the parameters converge: the absolute difference of log-likelihood values in two successive iterations is less than a specified tolerance level.
(h) If the criterion is not met, go back to (c), otherwise stop and output the final log-likelihood value.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
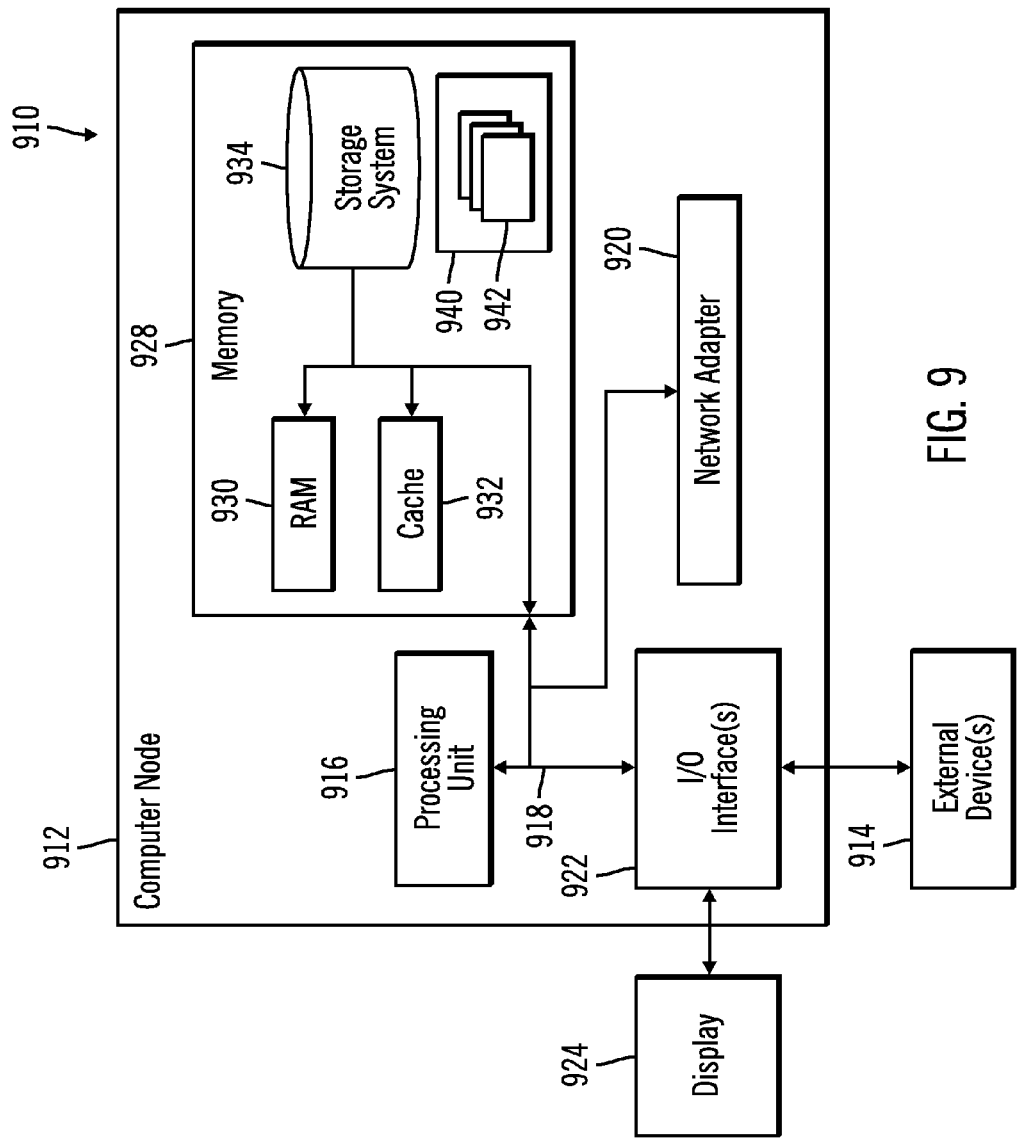
FIG. 9 illustrates a cloud computing node in accordance with certain embodiments.

Referring now to FIG. 9, a schematic of an example of a cloud computing node is shown. Cloud computing node 910 is only one example of a suitable cloud computing node and is not intended to suggest any limitation as to the scope of use or functionality of embodiments of the invention described herein. Regardless, cloud computing node 910 is capable of being implemented and/or performing any of the functionality set forth hereinabove.

In cloud computing node 910 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in cloud computing node 910 is shown in the form of a general-purpose computing device. The components of computer system/server 912 may include, but are not limited to, one or more processors or processing units 916, a system memory 928, and a bus 918 that couples various system components including system memory 928 to a processor or processing unit 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 912 typically includes a variety of computer system readable media. Such media may be any available media that is accessible by computer system/server 912, and it includes both volatile and non-volatile media, removable and non-removable media.

System memory 928 can include computer system readable media in the form of volatile memory, such as random access memory (RAM) 930 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems, etc.

Figure 10:
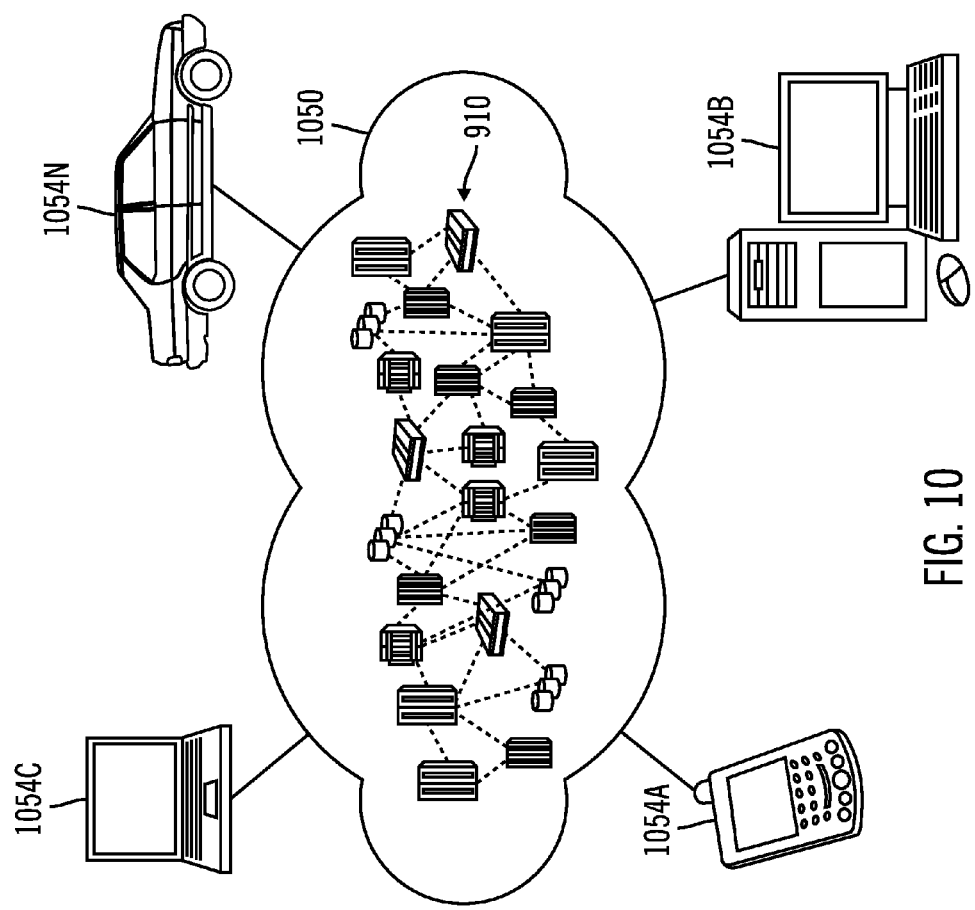
FIG. 10 illustrates a cloud computing environment in accordance with certain embodiments.

Referring now to FIG. 10, illustrative cloud computing environment 1050 is depicted. As shown, cloud computing environment 1050 comprises one or more cloud computing nodes 910 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 910 and cloud computing environment 1050 can communicate with any type of computerized device over any type of network and/or network addressable connection (e.g., using a web browser).

Figure 11:
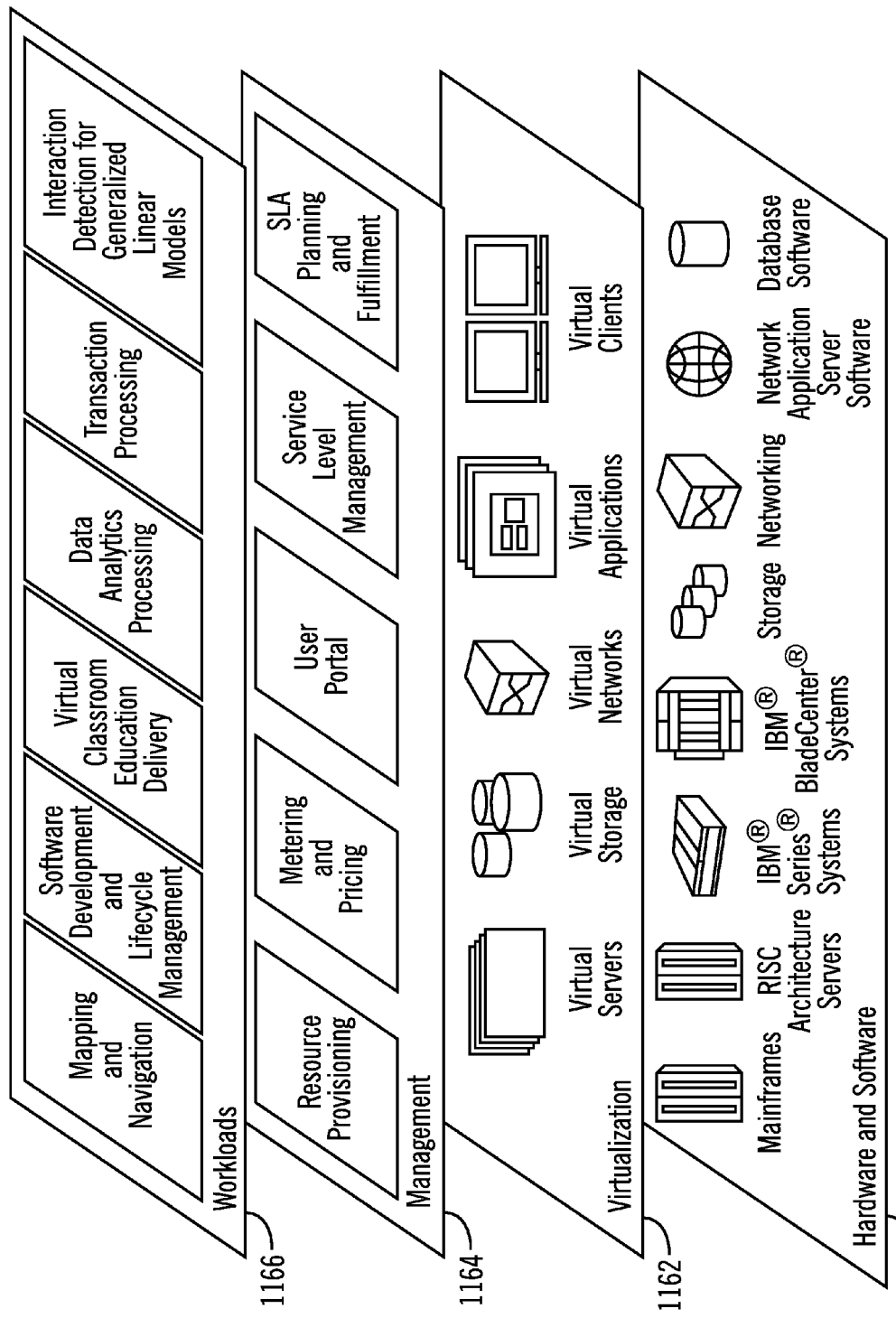
FIG. 11 illustrates abstraction model layers in accordance with certain embodiments.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1162 provides an abstraction layer from which the following examples of virtual entities may be provided: virtual servers; virtual storage; virtual networks, including virtual private networks; virtual applications and operating systems; and virtual clients.

In one example, management layer 1164 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1166 provides examples of functionality for which the cloud computing environment may be utilized. Examples of workloads and functions which may be provided from this layer include: mapping and navigation; software development and lifecycle management; virtual classroom education delivery; data analytics processing; transaction processing; and interaction detection for generalized linear models.

Thus, in certain embodiments, software or a program, implementing interaction detection for generalized linear models in accordance with embodiments described herein, is provided as a service in a cloud environment.

In certain embodiments, computing device 100 has the architecture of computing node 910. In certain embodiments, computing device 100 is part of a cloud environment. In certain alternative embodiments, computing device 100 is not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (e.g., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A computer program product, the computer program product comprising a computer readable storage medium having program code embodied therewith, the program code executable by at least one processor to:
    calculate, by the at least one processor, basic statistics for a pair of categorical predictor variables and a target variable from a dataset during a single pass over the dataset, wherein the basic statistics include a number of categories for a first categorical predictor variable of the pair and a number of categories for a second categorical predictor variable of the pair, and wherein the target variable is associated with a purchase decision; and
    determine, by the at least one processor, that there are significant interaction effects for the pair of categorical predictor variables on the target variable based on a pattern by:
        calculating, by the at least one processor, a log-likelihood value for a full generalized linear model without estimating model parameters;
        calculating, by the at least one processor, the model parameters for a reduced generalized linear model with a recursive marginal mean accumulation technique using the basic statistics based on the single pass over the dataset;
        calculating, by the at least one processor, a log-likelihood value for the reduced generalized linear model;
        calculating, by the at least one processor, a likelihood ratio test statistic using the log-likelihood value for the full generalized linear model and the log-likelihood value for the reduced generalized linear model;
        calculating, by the at least one processor, a p-value of the likelihood ratio test statistic; and
        comparing, by the at least one processor, the p-value to a significance level; and
    output the significant interaction effects for the pair of categorical predictor variables on the target variable in a list for subsequent analyses to determine a behavior of the purchase decision.

2. The computer program product of claim 1, wherein the full generalized linear model is of the form $g(\mu)=X_i\beta_i+X_j\beta_j+(X_i \times X_j)\beta_{ij}$, wherein $g(\mu)$ is a link function of $\mu$ and $\mu$ is an expected value vector of the target variable Y, wherein $X_i$ and $X_j$ are the categorical predictor variables, and wherein $\beta_i$, $\beta_j$, and $\beta_{ij}$ are the model parameters.

3. The computer program product of claim 1, wherein the reduced generalized linear model is of the form $g(\mu)=X_i\beta_i+X_j\beta_j$, wherein $g(\mu)$ is a link function of $\mu$ and $\mu$ is an expected value vector of the target variable Y, wherein Xi and Xj are the categorical predictor variables, and wherein βi and βj are the model parameters.

4. The computer program product of claim 1, wherein the recursive marginal mean accumulation technique calculates search directions for the model parameters calculation by an iterative process based on accumulating weighted marginal means.

5. The computer program product of claim 1, wherein the program code is executable by the at least one processor to:
perform, by the at least one processor, m-way interaction detection among m categorical predicator variables, where m>2.

6. The computer program product of claim 1, wherein the program code is executable by the at least one processor to:
perform, by the at least one processor, m-way interaction detection among multiple possible combinations of m categorical predictor variables, where m>1, wherein the dataset contains predictor variables, and the basic statistics for each of the possible combinations are calculated during a single pass over the dataset.

7. The computer program product of claim 1, wherein a Software as a Service (SaaS) is configured to perform the computer program product operations.

8. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to:
calculate basic statistics for a pair of categorical predictor variables and a target variable from a dataset during a single pass over the dataset, wherein the basic statistics include a number of categories for a first categorical predictor variable of the pair and a number of categories for a second categorical predictor variable of the pair, and wherein the target variable is associated with a purchase decision; and
determine that there are significant interaction effects for the pair of categorical predictor variables on the target variable based on a pattern by:
calculating a log-likelihood value for a full generalized linear model without estimating model parameters;
calculating the model parameters for a reduced generalized linear model with a recursive marginal mean accumulation technique using the basic statistics based on the single pass over the dataset;
calculating a log-likelihood value for the reduced generalized linear model;
calculating a likelihood ratio test statistic using the log-likelihood value for the full generalized linear model and the log-likelihood value for the reduced generalized linear model;
calculating a p-value of the likelihood ratio test statistic; and
comparing the p-value to a significance level; and
output the significant interaction effects for the pair of categorical predictor variables on the target variable in a list for subsequent analyses to determine a behavior of the purchase decision.

9. The computer system of claim 8, wherein the full generalized linear model is of the form $g(\mu)=Xi\beta i+Xj\beta j+(Xi\times Xj)\beta ij$, wherein $g(\mu)$ is a link function of $\mu$ and $\mu$ is an expected value vector of the target variable Y, wherein Xi and Xj are the categorical predictor variables, and wherein βi, βj, and βij are the model parameters.

10. The computer system of claim 8, wherein the reduced generalized linear model is of the form $g(\mu)=Xi\beta i+Xj\beta j$, wherein $g(\mu)$ is a link function of $\mu$ and $\mu$ is an expected value vector of the target variable Y, wherein Xi and Xj are the categorical predictor variables, and wherein βi and βj are the model parameters.

11. The computer system of claim 8, wherein the recursive marginal mean accumulation technique calculates search directions for the model parameters calculation by an iterative process based on accumulating weighted marginal means.

12. The computer system of claim 8, further comprising:
the program instructions, stored on the at least one of the one or more storage devices for execution by the at least one of the one or more processors via the at least one of the one or more memories, to:
perform m-way interaction detection among m categorical predicator variables, where m>2.

13. The computer system of claim 8, further comprising:
the program instructions, stored on the at least one of the one or more storage devices for execution by the at least one of the one or more processors via the at least one of the one or more memories, to:
perform m-way interaction detection among multiple possible combinations of m categorical predictor variables, where m>1, wherein the dataset contains predictor variables, and the basic statistics for each of the possible combinations are calculated during a single pass over the dataset.

14. The computer system of claim 8, wherein a Software as a Service (SaaS) is provided to perform the system operations.

* * * * *